(12) United States Patent
Okanda

(10) Patent No.: US 7,640,642 B2
(45) Date of Patent: Jan. 5, 2010

(54) MACHINE TOOL APPARATUS

(75) Inventor: Satoshi Okanda, Tokyo (JP)

(73) Assignee: OKS Co., Ltd. (JP)

( * ) Notice: Subject to any disclaimer, the term of this patent is extended or adjusted under 35 U.S.C. 154(b) by 0 days.

(21) Appl. No.: 12/297,440

(22) PCT Filed: May 12, 2006

(86) PCT No.: PCT/JP2006/309560

§ 371 (c)(1),
(2), (4) Date: Oct. 16, 2008

(87) PCT Pub. No.: WO2007/132507

PCT Pub. Date: Nov. 22, 2007

(65) Prior Publication Data

US 2009/0094815 A1    Apr. 16, 2009

(51) Int. Cl.
*B23Q 7/00* (2006.01)
(52) U.S. Cl. .................. 29/33 P; 409/134; 198/346.1; 269/309
(58) Field of Classification Search ................. 29/33 P, 29/563; 198/346.1, 345.3; 269/309; 414/222.04–222.06, 414/222.07, 222.13, 226.04; 409/134
See application file for complete search history.

(56) References Cited

U.S. PATENT DOCUMENTS

| | | | | |
|---|---|---|---|---|
| 4,173,817 A | * | 11/1979 | Voglrieder et al. | 483/14 |
| 4,449,277 A | * | 5/1984 | Hasegawa et al. | 29/33 P |
| 4,534,546 A | * | 8/1985 | Cattani | 269/309 |
| 4,583,631 A | * | 4/1986 | Yonezawa et al. | 198/345.3 |
| 4,999,895 A | * | 3/1991 | Hirose et al. | 29/33 P |
| 5,018,617 A | * | 5/1991 | Miyata et al. | 198/346.1 |

(Continued)

FOREIGN PATENT DOCUMENTS

JP    03-136737 A    *    6/1991

(Continued)

OTHER PUBLICATIONS

Machine Translation of JP-2002-154029, which '029 was published in May 2002.*

(Continued)

*Primary Examiner*—Erica E Cadugan
(74) *Attorney, Agent, or Firm*—Hayes Soloway P.C.

(57) ABSTRACT

To provide a machine tool of which the operation rate can be increased by reducing time for suspending an operation for machining an object to be machined during the object-machining operation using the machine tool. A jig includes at least a first jig (5) disposed in a casing (2) and a second jig (14) by which an object (8) is detachably held. The jigger has attaching/detaching structure (17) for detachably mounting the second jig (14) onto the first jig (5). The second jig (14) is provided with grip parts (32) for gripping the second jig (14) during its movement. The casing (2) is provided with an opening (S) for taking in and out the second jig (14) relatively to the position where the object is to be machined from the outside of the casing (2), and guide passages (18), (22) for guiding generally horizontal movement of the second jigs (14) are provided at least between the above-said position and the opening (S) so that the second jig (14) gripped by the grip parts (32) can be moved along the guide passages (18), (22).

10 Claims, 14 Drawing Sheets

U.S. PATENT DOCUMENTS

| | | | |
|---|---|---|---|
| 5,156,254 A * | 10/1992 | Kitamura et al. | 198/346.1 |
| 5,259,494 A * | 11/1993 | Hirose | 198/345.3 |
| 6,219,893 B1 * | 4/2001 | Nordquist | 29/33 P |
| 2004/0182680 A1 * | 9/2004 | Stave | 198/346.1 |
| 2005/0238447 A1 | 10/2005 | Murota et al. | |
| 2006/0118384 A1 * | 6/2006 | Funakoshi et al. | 198/345.3 |

FOREIGN PATENT DOCUMENTS

| | | |
|---|---|---|
| JP | 3-264243 | 11/1991 |
| JP | 10-263974 | 10/1998 |
| JP | 2002-154029 | 5/2002 |
| JP | 2002-361537 | 12/2002 |
| JP | 2005-188670 | 7/2005 |
| JP | 2005-313239 | 11/2005 |

OTHER PUBLICATIONS

International Preliminary Report on Patentability, PCT/JP2006/309560, Dec. 24, 2008.

* cited by examiner

MACHINE TOOL APPARATUS

TECHNICAL FIELD

The present invention relates to a machine tool apparatus for machining a machining object using a tool by controlling the relative position between the tool and the machining object held by a jig.

BACKGROUND ART

There are conventional machine tools in which a controller ascertains the positional information of a tool and a machining object that is specified by a coordinate value, and the controller drives a drive motor housed in the machine tool on the basis of the positional information, whereby the tool and the machining object are moved and machining is carried out (e.g., see Patent Document 1)
Patent Document 1: Japanese Laid-open Patent Application No. 2005-313239 (Page 5, FIG. 1)

DISCLOSURE OF THE INVENTION

Problems to be Solved by the Invention

However, the machine tool described in Patent Document 1 has a problem in that the time for stopping the machine tool is extended and the utilization ratio of the machine tool is reduced because, in general, when the machining object designed to be machined is mounted on a jig and machined, the machine tool must be stopped each time the machining object is machined, the machined object must be dismounted from the jig fixed at the machining position in which the machining object is to be machined by the tool, an unfinished machining object must be mounted on the jig, and time is required in the mounting/dismounting work for switching out the machining object.

The present invention was contrived in view of the foregoing problems, and an object is to provide a machine tool that can reduce the time for stopping the work of machining a machining object, and that can improve the utilization ratio in the work of machining a machining object using a machine tool.

Means for Solving the Problems

In order to solve the above-described problems, the machine tool apparatus according to a first aspect of the present invention is an apparatus for machining a machining object using a tool by controlling the relative position between the tool and the machining object held in a jig, the machine tool apparatus characterized in that:

the jig comprises at least a first jig disposed in a machining position of the machining object disposed inside a case of the machine tool apparatus, and a second jig which is moveably configured so as to be separate from the first jig and in which the machining object is detachably held;

the first jig and the second jig have mounting/dismounting means for detachably mounting the second jig on the first jig, and the second jig is provided with a handle for gripping when the second jig is to be moved; and the case is provided with an aperture for loading and unloading the jig from the exterior of the case to the machining position, a guidance pathway for moving and guiding the second jig in substantially the horizontal direction is provided between at least the machining position and the aperture, and the second jig can be moved along the guidance pathway in a state in which the handle is held.

In accordance with this aspect, the user can easily move the second jig between the aperture of the case and the machining position by merely gripping the handle and applying a force in the horizontal direction in order to move and guide the second jig in the horizontal direction via the guidance pathway. The machining object is removed from inside the case together with the second jig after machining has ended, whereupon a new second jig that is separate from the second jig on which the machining object is mounted in advance can be mounted instead on the first jig, i.e., in the machining position. Therefore, the utilization ratio of the machine tool apparatus can thereby be effectively improved because the work for mounting and dismounting the machining object is not required to be performed in the machining position, and the time for stopping the work for machining the machining object can be reduced.

The machine tool apparatus according to a second aspect of the present invention is the machine tool apparatus according to the first aspect, characterized in that:

the guidance pathway is composed of a rail member; and the second jig has an engagement groove that engages the rail member.

In accordance with this aspect, the second jig can be moved without shaking along the rail member. Therefore, the first and second jigs can be easily positioned when the second jig is mounted on the first jig.

The machine tool apparatus according to a third aspect of the present invention is the machine tool apparatus according to the first or second aspect, characterized in that: the guidance pathway is provided with a plurality of rollers that are brought into contact with the second jig.

In accordance with this aspect, the user can more easily move the second jig because the friction resistance when the second jig moves along the guidance pathway is reduced by a plurality of rollers.

The machine tool apparatus according to a fourth aspect of the present invention is the machine tool apparatus according to the any of the first to third aspects, characterized in that:

a convexity that fits into the second jig is provided to the first jig; and a concavity that fits onto the convexity is provided to the second jig.

In accordance with this aspect, the concavity of the second jig is fitted onto the convexity of the first jig, whereby the second jig can be accurately positioned in relation to the first jig.

The machine tool apparatus according to a fifth aspect of the present invention is the machine tool apparatus according to the fourth aspect, characterized in that: the mounting/dismounting means is disposed in the vicinity of the mutually fitting terminal portions of the convexity and the concavity, and is configured so that a mounting function performed by the mounting/dismounting means is carried out after the fitting of the convexity and the concavity is completed.

In accordance with this aspect, costs can be reduced because a member for mounting and dismounting the first and second jigs, and a member for positioning during mounting and dismounting, can be used in combination, and the second jig can be reliably mounted because the second jig is mounted on the first jig after positioning has been completed.

The machine tool apparatus according to a sixth aspect of the present invention is the machine tool apparatus according to the fourth or fifth aspects, characterized in that:

the convexity is provided to the upper surface of the first jig;

the concavity is provided to the lower surface of the second jig; and the rail members are disposed in a position above the first jig and include elevator rail members for elevating and lowering the second jig between the upper position and a fitting position of the convexity and the concavity.

In accordance with this aspect, the work of exchanging the second jig is facilitated because the second jig is reliably guided by an elevator rail member to a position above the first jig, and mounting by fitting the convexity and the concavity is carried out in a state in which the second jig is mounted on the elevator rail member.

The machine tool apparatus according to a seventh aspect of the present invention is the machine tool apparatus according to the sixth aspect, characterized in that:

the elevator rail members slope downward in a loading direction of the second jig; and the second jig, which is moved and guided by the elevator rail members, is provided with stopping means for stopping the first jig in an upper position.

In accordance with this aspect, the stopping means and the self-weight of the second jig operate together to position and stop the second jig in a position above the first jig, and the second jig does not backtrack due to the slope of the elevator rail member.

The machine tool apparatus according to an eighth aspect of the present invention is the machine tool apparatus according to any of the first to seventh aspects, characterized in that:

a mount on which the second jig can be mounted is disposed in a position close to the aperture outside of the case; and the mount has a single retracted position to which the second jig is retracted from the machining position, and also has, for the retracted position, at least two standby positions in which the machining object is mounted on or dismounted from the second jig.

In accordance with this aspect, the second jig is moved to one standby position and another second jig waiting in another standby position can be moved to the machining position via the retracted position, and exchange of the second jig can be rapidly carried out on the mount.

The machine tool apparatus according to a ninth aspect of the present invention is the machine tool apparatus according to the eighth aspect, characterized in that:

a sliding part for allowing the second jig to slide on the upper surface of the mount is formed on the bottom surface of the second jig; and the upper surface of the mount is positioned to substantially the same height as the guidance pathway.

In accordance with this aspect, the user can smoothly move the second jig between the mount and the guidance pathway by merely applying a force to the second jig in the horizontal direction.

BRIEF DESCRIPTION OF THE DRAWINGS

FIG. 7(*b*) is a longitudinal sectional front view showing the clamp apparatus after connection;

KEY

1, 1*a*, 1*b* NC machine tools (machine tool apparatuses)
2, 2*b* Cases
3 Drill tool (tool)
5, 5*b* Clamp palettes (first jig, machine position)
8 Workpiece (machining object)
11, 11*a* Mounts (standby position, retracted position)
13 Palette guides (standby position, retracted position)
14, 14*b* Work palettes (second jig)
17, 17*b* Clamp devices (convexities)
18 Elevator rail members (guidance pathway, elevator means)
21 Actuator (elevator means)
22 Fixed rail member (guidance pathway)
24, 25 Roller
26, 26*b* Contact pieces (stopping means)
32, 32*b* Handles (grips)
33 Engagement groove
34 Clamp ring (Concavity)
34' Engagement portion (mounting/dismounting means)
35' Sliding surface (sliding portion)
44 Ball (mounting/dismounting means)
45 Plate member (standby position, retracted position)
47 Machining surface plate (first jig, guidance pathway)
48 Fitting groove (concavity)
49 Clamp portion (convexity)
51 Ball (pivoting portion)

BEST MODE FOR CARRYING OUT THE INVENTION

Preferred embodiments for implementing the machine tool apparatus according to the present invention are described below using examples.

Embodiment 1

Figure 1:
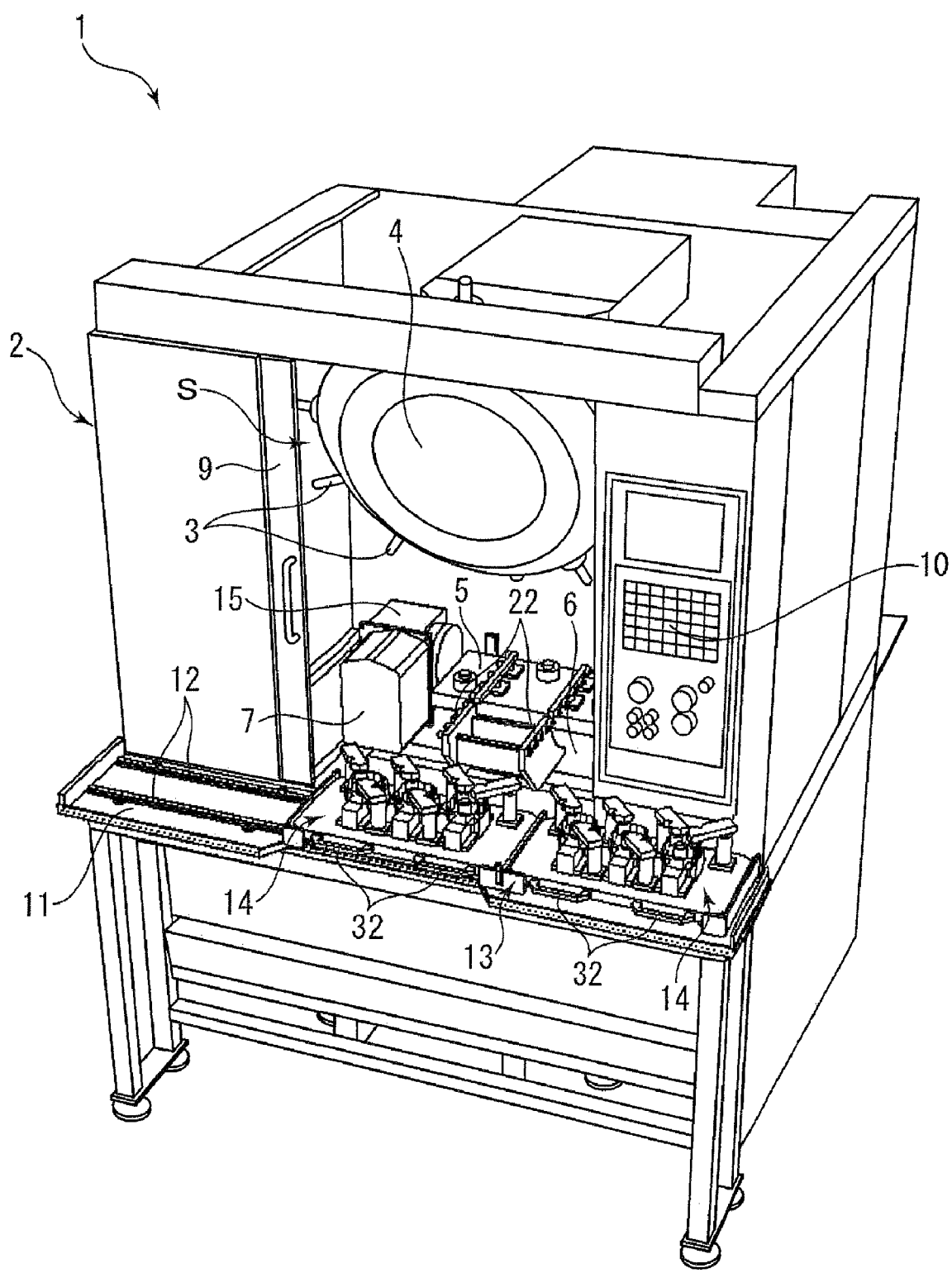
FIG. 1 is a perspective view showing the NC machine tool in embodiment 1.
Figure 2:
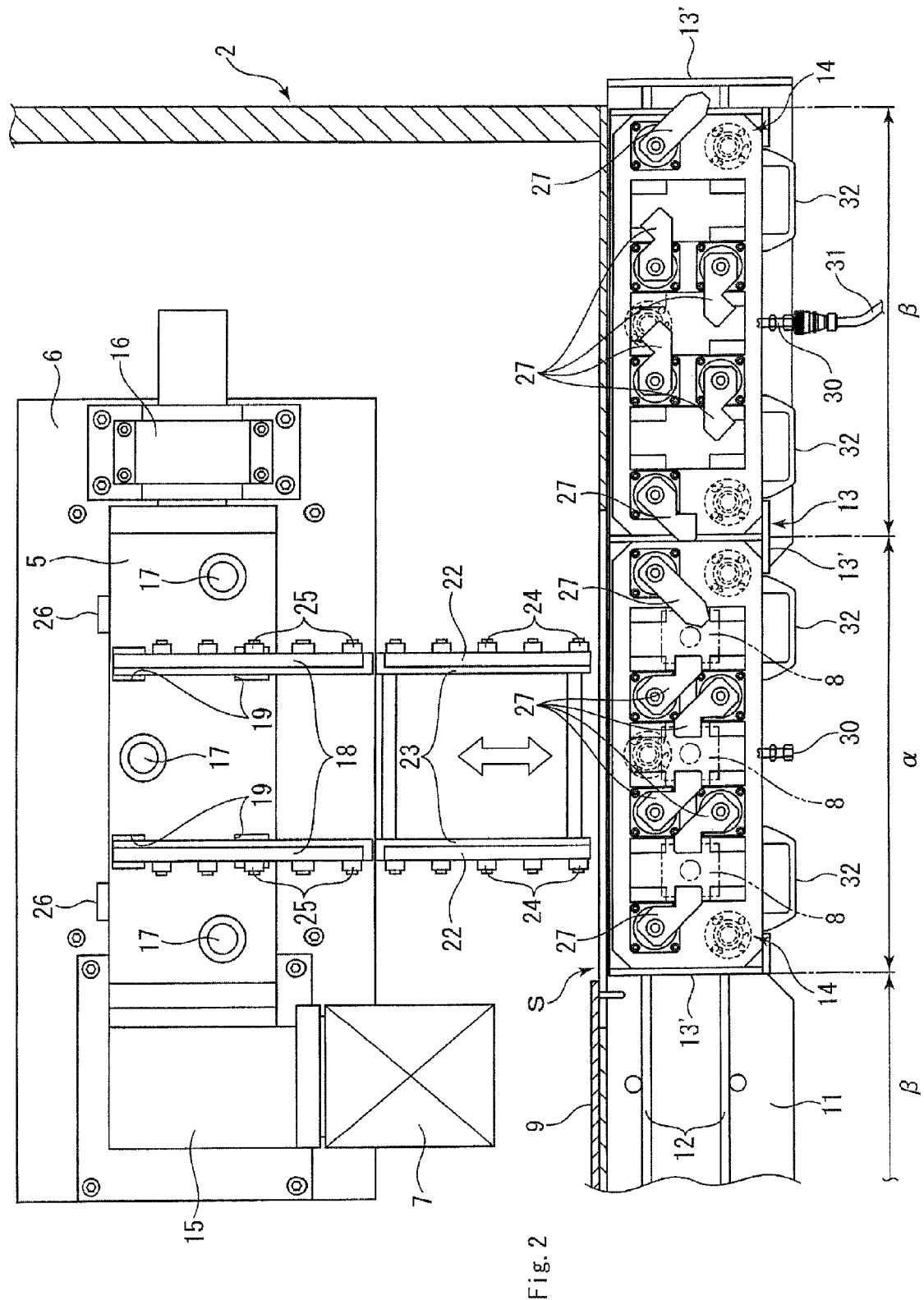
FIG. 2 is a plan view showing the clamp palette and the mount.
Figure 3:
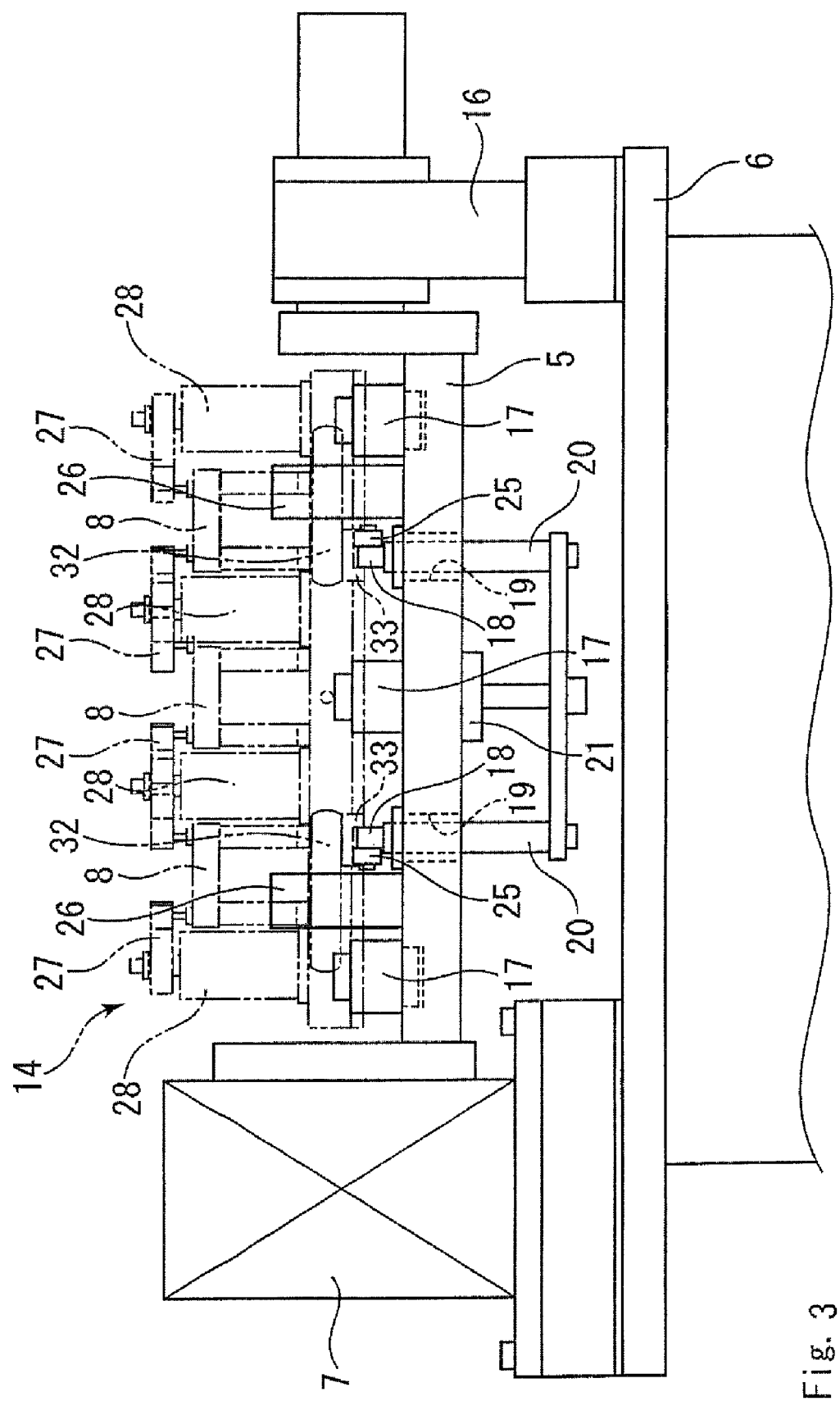
FIG. 3 is a front view showing the clamp palette.
Figure 4:
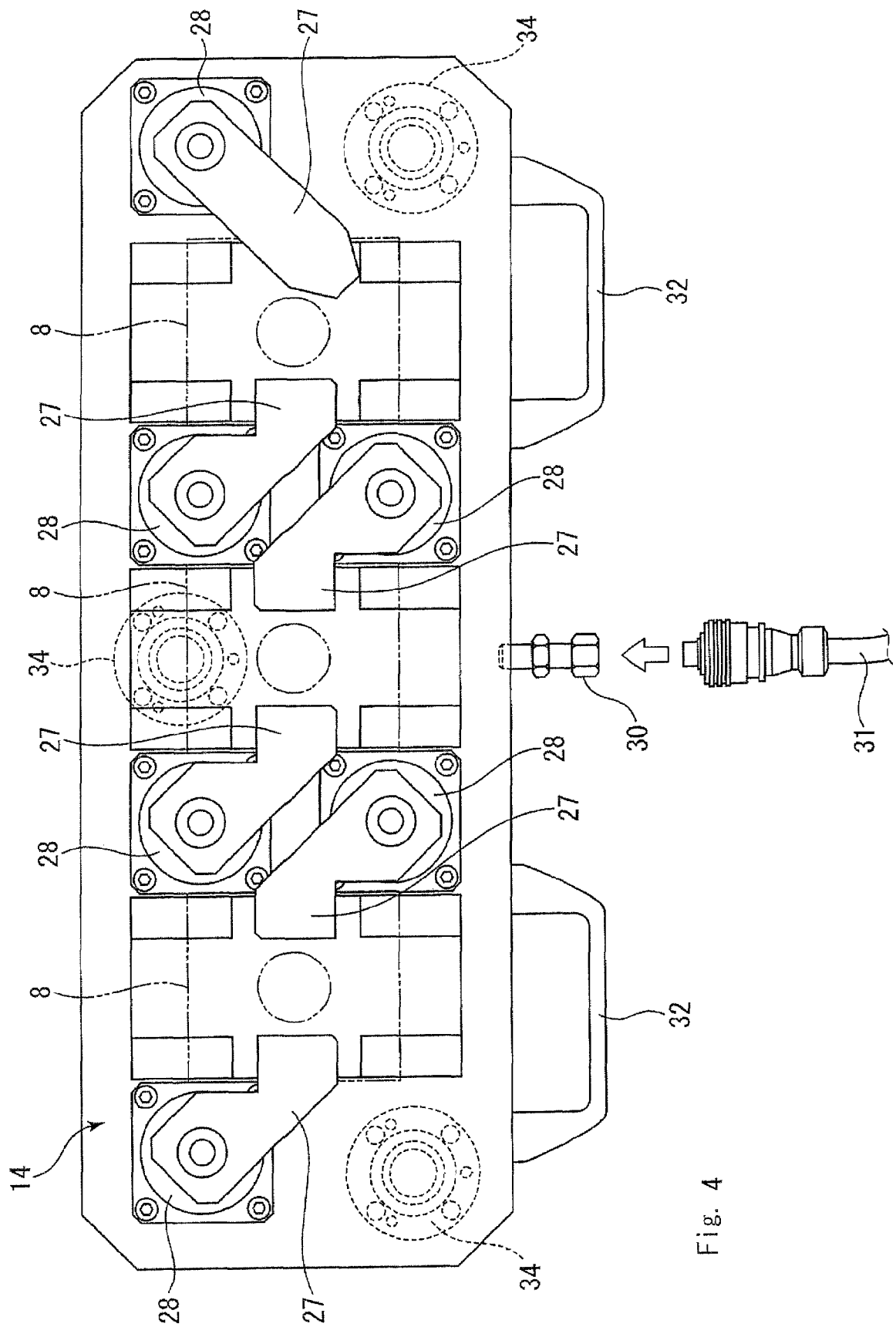
FIG. 4 is a plan view showing the work palette.
Figure 5:
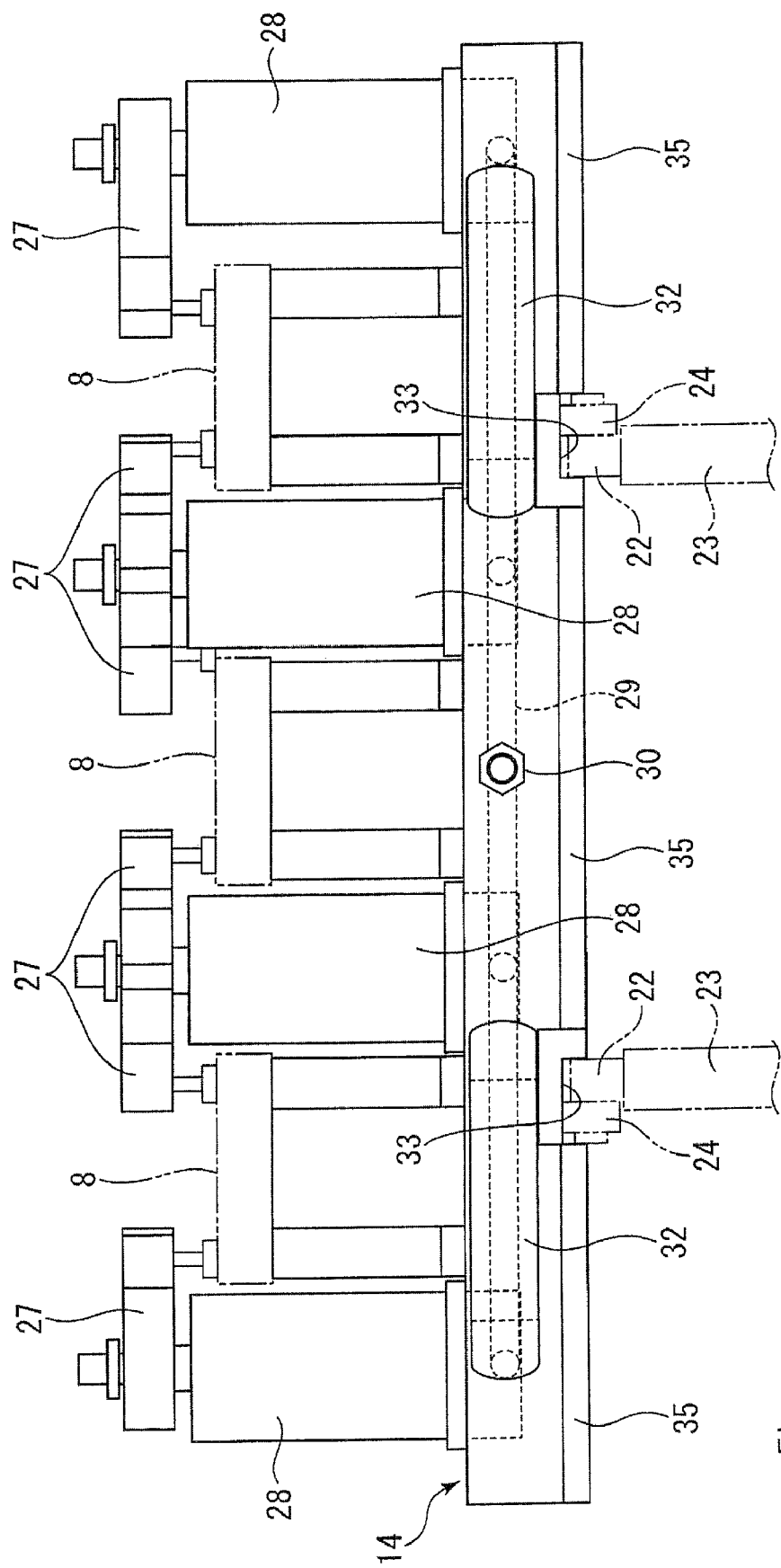
FIG. 5 is a front view showing the work palette.
Figure 6:
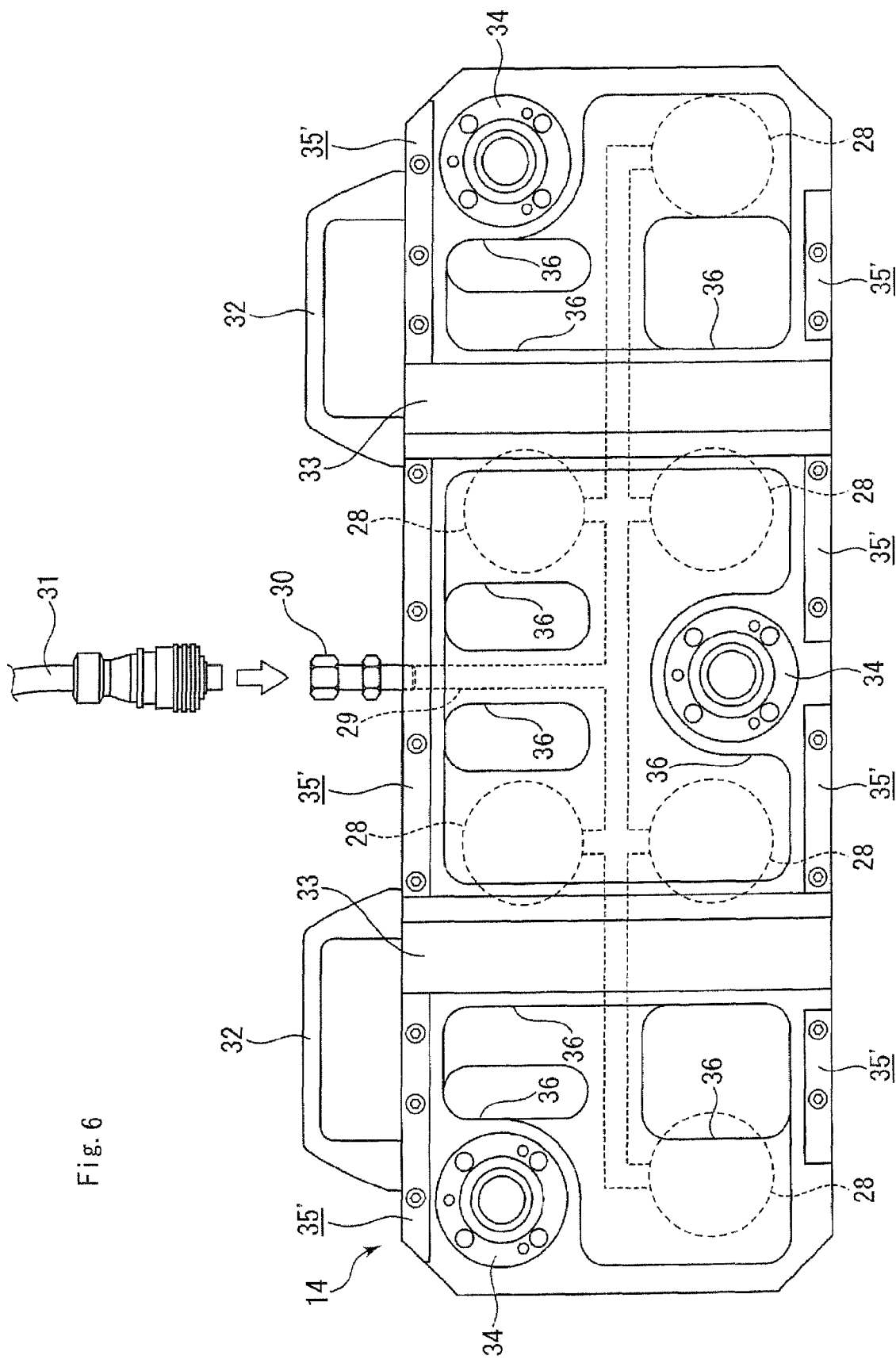
FIG. 6 is a bottom view showing the work palette.
Figure 7:
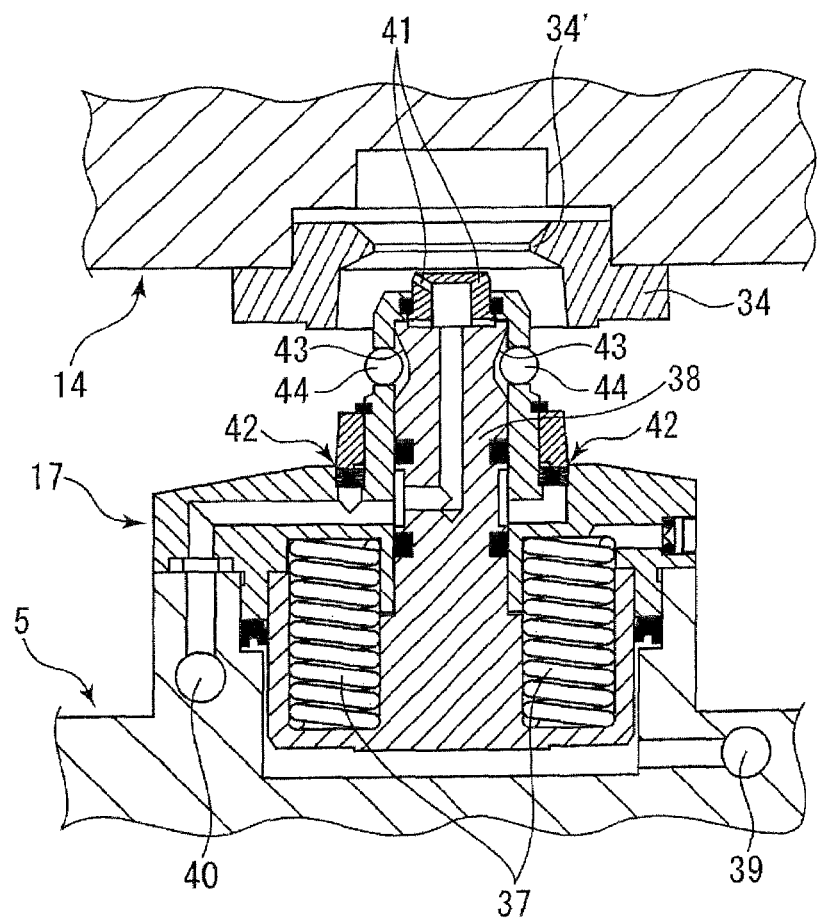
FIG. 7(*a*) is a longitudinal sectional front view showing the clamp apparatus prior to connection.
Figure 7:
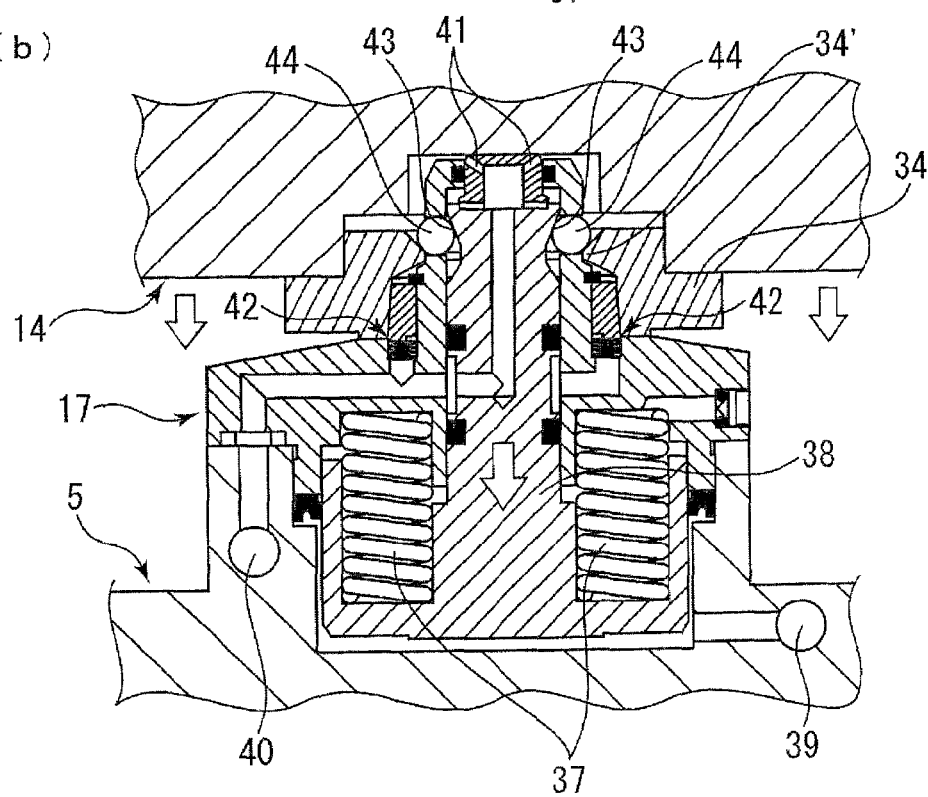

Examples of the present invention are described with reference to the diagrams. First, FIG. 1 is a perspective view showing the NC machine tool in embodiment 1, FIG. 2 is a plan view showing the clamp palette and the mount, FIG. 3 is a front view showing the clamp palette, FIG. 4 is a plan view showing the work palette, FIG. 5 is a front view showing the work palette, FIG. 6 is a bottom view showing the work palette, FIG. 7(*a*) is a longitudinal sectional front view showing the clamp apparatus prior to connection, FIG. 7(*b*) is a longitudinal sectional front view showing the clamp apparatus after connection, and FIGS. 8 to 11 are side views showing the work of machining a workpiece using an NC machine tool. Hereinbelow, the front side of the paper surface of FIG. 1 is the front surface (front side) of the NC machine tool, the lower side of the paper surface of FIGS. 2 and 4 is the front surface (front side) of the NC machine tool, the upper side of the paper surface of FIG. 6 is the front surface (front side) of the NC machine tool, and the left side of the paper surface of FIGS. 8 to 11 is the front surface (front side) of the NC machine tool.

Reference numeral 1 of FIG. 1 denotes an NC machine tool 1 used as the machine tool apparatus of the present invention, and a tool unit 4 on which a plurality of drill tools 3 is mounted is disposed inside a case 2 of the NC machine tool 1. A worktable 6 having a clamp palette 5 as a first jig of the present invention is disposed below the tool unit 4, and a drive motor 7 for actuating the clamp palette 5 is provided to the worktable 6 (see FIG. 2).

In the NC machine tool 1, the position of the tool unit 4 and the position of the workpiece 8 as the later-described machining object are defined by a coordinate value, and a controller (not shown) is configured to operate the tool unit 4 and the clamp palette 5 on the basis of the positional information. In other words, the relative position between the workpiece 8 and the tool unit 4 is controlled automatically. The arranged position of the worktable 6 provided with the clamp palette 5 is the machining position in which the workpiece 8 (machining object) is to be machined.

An aperture S for loading and removing later-described work palettes 14 is formed in the front surface of the case 2, and a sliding slide door 9 that is automatically opened and closed by the controller (not shown) is provided to the aperture S. The slide door 9 is closed so that grinding fluid, chips, and the like are not scattered to the exterior of the case 2 when machining work is carried out inside the case 2. A control panel 10 is disposed in the vicinity of the aperture S, and the user operates the control panel 10 in order to give instructions to the controller (not shown) and perform machining work.

A mount 11 having a long side extending in the left/right horizontal direction is positioned toward the front surface of the case 2, two guide rail members 12 are provided to the upper surface of the mount 11 along the lengthwise direction, and a palette guide 13 is provided that slides in the left/right direction on the guide rail members 12. The height of the upper surface of the palette guide 13 is substantially the same as the height of fixed rail members 22.

The palette guide 13 is designed so that two work palettes 14 can be arranged to the left and right and mounted as the second jig in the present invention on the upper surface of a plate member that forms a rectangle as viewed from above, as shown in FIG. 2. The guide has an erect piece 13' provided to the side surface and the front surface of the palette guide 13 to prevent the work palettes 14 from falling. The palette guide 13 is designed so as to be capable of moving on the mount 11 in the left/right direction along the guide rail members 12, and so that when one of the work palettes 14 of the two work palettes 14 disposed on the left and right of the palette guide 13 is positioned on the front surface of the aperture S of the case 2, the other work palette 14 can be moved to the area on the left or right of the mount 11.

The area at the front surface of the aperture S in the mount 11 constitutes a retracted position α of the present invention, and the areas on the left and right sides in the mount 11, i.e., the areas provided to the left and right of the retracted position α, constitute the standby positions β of the present invention. For example, in FIG. 2, the palette guide 13 is moved to the right side of the mount 11, the left side of the palette guide 13 becomes the retracted position α at this time, and the right side of the palette guide 13 becomes the standby position β. In the case that the palette guide 13 is moved to the left side of the mount 11, the right side of the palette guide 13 becomes the retracted position α, and the left side of the palette guide 13 becomes the standby position β.

The drive motor 7 and clamp palette 5 are disposed in the upper portion of the worktable 6, as shown in FIG. 2. The clamp palette 5 has the shape of a rectangular plate as viewed from above, and power from the drive motor 7 disposed toward the left end of the clamp palette is transmitted to the clamp palette 5 via a rotating gear 15. A pivot bearing 16 is disposed toward the left end of the clamp palette 5, and the clamp palette 5 is rotated in the vertical direction when the controller (not shown) drives the drive motor 7 (see FIG. 11).

Three clamp devices 17 constituting the convexities of the present invention, and two elevator-rail members 18 (elevator means) extending in the forward/rearward horizontal direction, are disposed on the upper surface of the clamp palette 5. Elevator rail members 18 are fixed to the upper end of a support rod 20 that passes completely through the clamp palette 5 via a hole portion 19 provided to the clamp palette 5, and the support rod 20 is connected to an actuator 21 as the elevator means of the present invention provided to the lower surface of the clamp palette 5. The elevator rail members 18 are moved in the vertical direction relative to the clamp palette 5 by driving the actuator 21, and the elevator rail members 18 can be brought close to or moved away from the clamp palette 5.

Two fixed rail members 22 are positioned toward the front surface of the clamp palette 5 so as to extend in the forward/rearward horizontal direction, as shown in FIG. 2. The fixed rail members 22 are fixed to the worktable 6 via metal support fittings 23 (see FIG. 8), and extend from the vicinity of the front-end portion of the elevator rail members 18 to the vicinity of the aperture S. A plurality of rollers 24, 25 is provided to the side portion of the elevator rail members 18 and the fixed rail members 22. The elevator rail members 18 and the fixed rail members 22 constitute the guidance pathway of the present invention.

Two fixed rail members 22 are positioned toward the front surface of the clamp palette 5 so as to extend in the forward/rearward horizontal direction, as shown in FIG. 2. The fixed rail members 22 are fixed to the worktable 6 via metal support fittings 23 (see FIG. 8), and extend from the vicinity of the front-end portion of the elevator rail members 18 to the vicinity of the aperture S. A plurality of rollers 24, 25 is provided to the side portion of the elevator rail members 18 and the fixed rail members 22. The elevator rail members 18 and the fixed rail members 22 constitute the guidance pathway of the present invention.

The elevator rail members 18 and clamp palette 5 are slightly inclined downward to the rearward side of the work palettes 14 (loading direction of the work palettes 14), and the angle of inclination is about 2 to 3 degrees. Contact pieces 26, used as a stopping means of the present invention, are erectly provided to the rear end side of the clamp palette 5.

The work palettes 14 are described in detail next. The work palettes 14 have a rectangular plate shape as viewed from above, as shown in FIG. 4. Six chucks 27 as holding means are provided to the upper surface of each of the work palettes, and a plurality (three in the present embodiment) of workpieces 8 can be detachably held in place. The chucks 27 are provided above cylinders 28 disposed on the upper surface of the work palettes 14, and are urged by a coil spring (not shown) disposed inside the cylinders 28 so as to constantly move downward, as shown in FIG. 5. The workpiece 8 is fixed by the urging force of the coil spring.

A hydraulic branch tube 29 connected to the cylinders 28 is arranged inside the work palettes 14, and the hydraulic branch tube 29 is connected to a socket 30 disposed on the periphery at the front surface of the work palettes 14, as shown in FIG. 6. The user connects an air hose 31 to the socket 30 when the workpiece 8 is to be removed from the work palettes 14. When compressed air (fluid) is allowed to flow into the interior of the hydraulic branch tube 29, the fluid pressure acts against the urging force of the coil springs (not shown) inside the cylinders 28, the coil springs (not shown) are compressed and made to push the chucks 27 upward, the holding state of the workpiece 8 is cancelled, and the workpiece 8 can be removed from the work palettes 14.

Two handles 32 are provided as grips of the present invention on the periphery at the front surface of each of the work palettes 14. Engagement grooves 33 extending in the forward/rearward direction are furthermore formed on the bottom surface of the work palettes 14. The engagement grooves 33 have a metal plate that is curved and formed so as to form the shape of the letter "L" as viewed from the front surface, and the left/right width of the engagement grooves 33 is substantially the same as the left/right width of the elevator rail members 18 and the fixed rail members 22.

The engagement grooves 33 engage the elevator rail members 18 and the fixed rail members 22 (see FIG. 5) when the work palettes 14 are moved between the mount 11 and the clamp palette 5. The elevator rail members 18 and the fixed rail members 22 engage the engagement grooves 33, whereupon rollers 24, 25 provided to the elevator rail members 18 and to the fixed rail members 22 make contact with the engagement grooves 33.

A guide piece 35 is provided to the periphery at the front, back, and side surfaces on the bottom surface of the work palettes 14, and the guide piece 35 makes contact with the erect piece 13' of the palette guide 13 when the work palettes 14 are mounted on the palette guide 13.

The lower end of the guide piece 35 is extended below the lower end of clamp rings 34, and the lower surface of the guide piece 35 has a sliding surface 35' as the sliding part of the present invention with which contact is made when the work palettes 14 are slidably moved on the palette guide 13. Accordingly, the upper surface of the palette guide 13 can be prevented from making contact with the clamp rings 34 when the work palettes 14 are mounted on the palette guide 13, and there is no danger that defects and warping will be generated in the clamp rings 34.

A fluororesin may be applied to the engagement grooves 33 and the guide piece 35 in order to reduce sliding resistance on the surface of the engagement grooves and the guide piece, and the engagement grooves 33 and the guide piece 35 as such may be formed using a resin or the like having low sliding resistance. Although not shown in particular, a plurality of rollers or the like may be disposed on the bottom surface of the work palettes 14 to reduce friction resistance during slidable movement on the fixed rail members 22, the elevator rail members 18, and the palette guide 13.

Three clamp rings 34 that constitute the concavities of the present invention and are connected to the three clamp devices 17 described above are provided to the bottom surface of the work palettes 14, and the clamp rings 34 are connected to the clamp devices 17, whereby the work palettes 14 are mounted on the clamp palette 5.

The work palettes 14 in the present embodiment are formed using aluminum, duralumin, or another lightweight metal material in order to reduce the weight of the work palettes, and lightening holes 36 for reducing weight are formed in a plurality of locations in the bottom surface of the work palettes 14. Each of the work palettes 14 of the present embodiment is formed so that the weight is 15 kg or less, and the palettes have a weight and size that allows the work palettes to be easily carried by the user.

The clamp devices 17 and the clamp rings 34 will be described next. A piston rod 38 urged downward by a clamp spring 37 is provided to the clamp devices 17, and the piston rod 38 is moved upward by the pressure of the hydraulic fluid fed from the hydraulic fluid supply tube 39 to the lower surface of the piston rod 38 in a state in which the work palettes 14 have been dismounted from the clamp palette 5, as shown in FIG. 7(a).

An air supply tube 40 is connected to the clamp devices 17; compressed air fed from the air supply tube 40 is discharged from a discharge port 41 provided to the upper end portion of the piston rod 38 and from a gap 42 provided to the step portion of each of the clamp devices 17; and grinding fluid, chips, and the like that adhere to the clamp devices 17 and the clamp rings 34 are removed by the discharged air.

A controller (not shown) reduces the hydraulic pressure of the hydraulic fluid supplied from the hydraulic fluid supply tube 39 when the elevator rail members 18 are lowered and the clamp rings 34 make contact above the clamp devices 17 in the case that the work palettes 14 and the clamp palette 5 are connected, as shown in FIG. 7(b). At this time, the piston rod 38 is lowered by the urging force of the clamp spring 37, the upper portion of the clamp devices 17 is inserted into the clamp rings 34, and the clamp devices 17 and clamp rings 34 fit each other.

Balls 44 make contact with an inclined surface 43 formed on the side surface of the piston rod 38 at the same time that the piston rod 38 descends, and the balls 44 protrude outward from the clamp devices 17. The protruding balls 44 engage an engagement portion 34' formed in the clamp rings 34, and the clamp rings 34 and the clamp devices 17 are connected. The locations in which the engagement portion 34' and the balls 44 are provided to the clamp rings 34 and the clamp devices 17 constitute fitting terminal portions of the present invention.

When the clamp rings and the clamp devices 17 are connected and held close to each other, the outflow of air from the discharge port 41 and the gap 42 stops, a sensor (not shown) disposed inside the air supply tube 40 senses that the outflow of the air has stopped, and a controller (not shown) actuates the drive motor 7 and the tool unit 4 on the basis of the sensing of the sensor (not shown) to start machining work.

The piston rod 38 is moved upward by the hydraulic pressure, and the balls 44 move away from the inclined surface 43 of the piston rod 38, when the hydraulic pressure of the hydraulic fluid supplied from the hydraulic fluid supply tube 39 is increased in the case that the connection state between the work palettes 14 and the clamp palette 5 is released. Therefore, the balls 44 are accommodated inside the clamp devices 17, the engagement state between the balls 44 and the clamp rings 34 is released, and the work palettes 14 are dismounted from the clamp palette 5.

Figure 8:
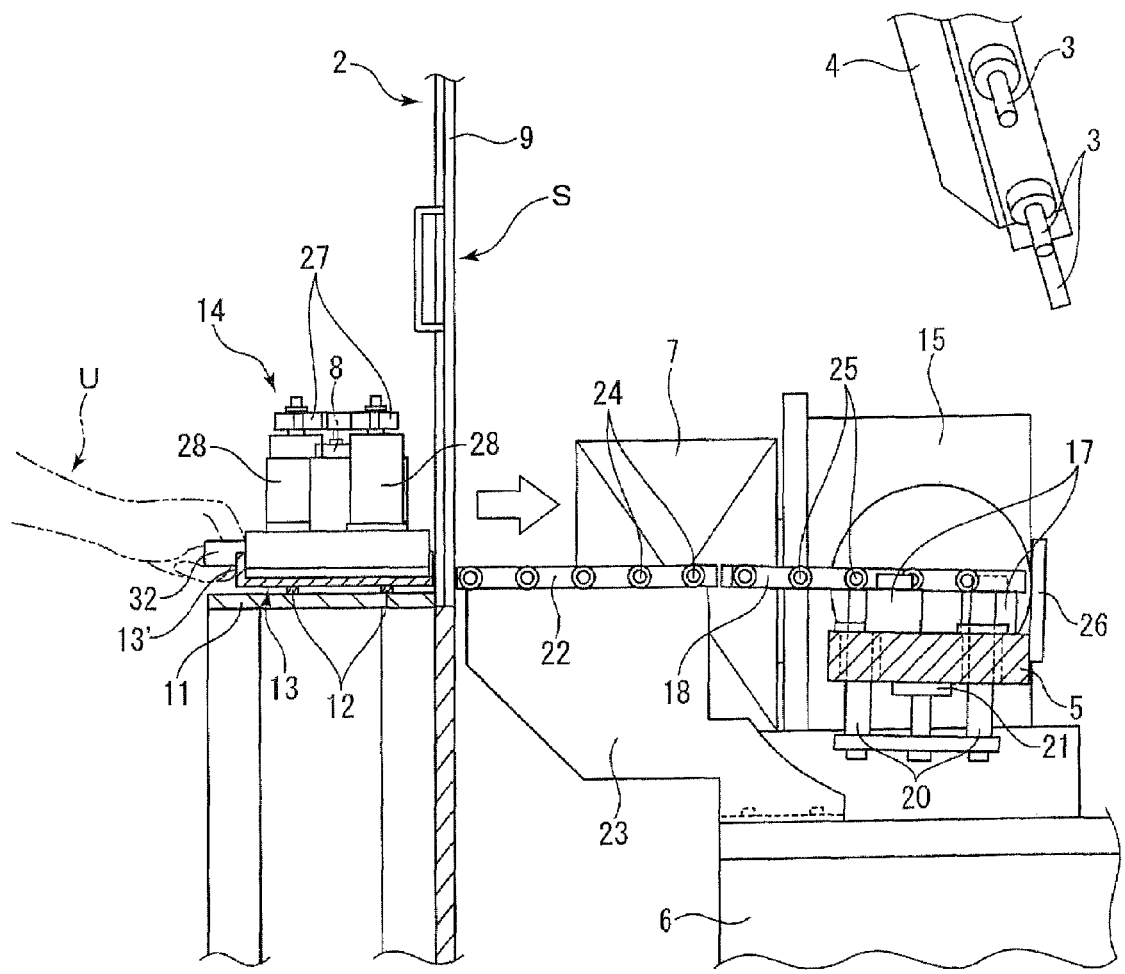
FIG. 8 is a side view showing the work of machining a workpiece using an NC machine tool.

Application examples of the NC machine tool 1 are described next with reference to FIG. 2 and FIGS. 8 through 11. First, the user moves the palette guide 13 so that one of the work palettes 14 holding a workpiece 8, among the two left and right work palettes 14 mounted on the palette guide 13, is disposed at the front surface of the fixed rail members 22, i.e., the retracted position α, as shown in FIG. 2. The user U grips the handles 32 of one of the work palettes 14 disposed in the retracted position α, as shown in FIG. 8, and presses the work palettes 14 into the interior of the case 2 while sliding [the work palettes] on the fixed rail members 22 and the elevator rail members 18, as shown in FIG. 8. In other words, the work palettes 14 are moved horizontally to the machining position while being guided by the fixed rail members 22 and the elevator rail members 18.

Figure 9:
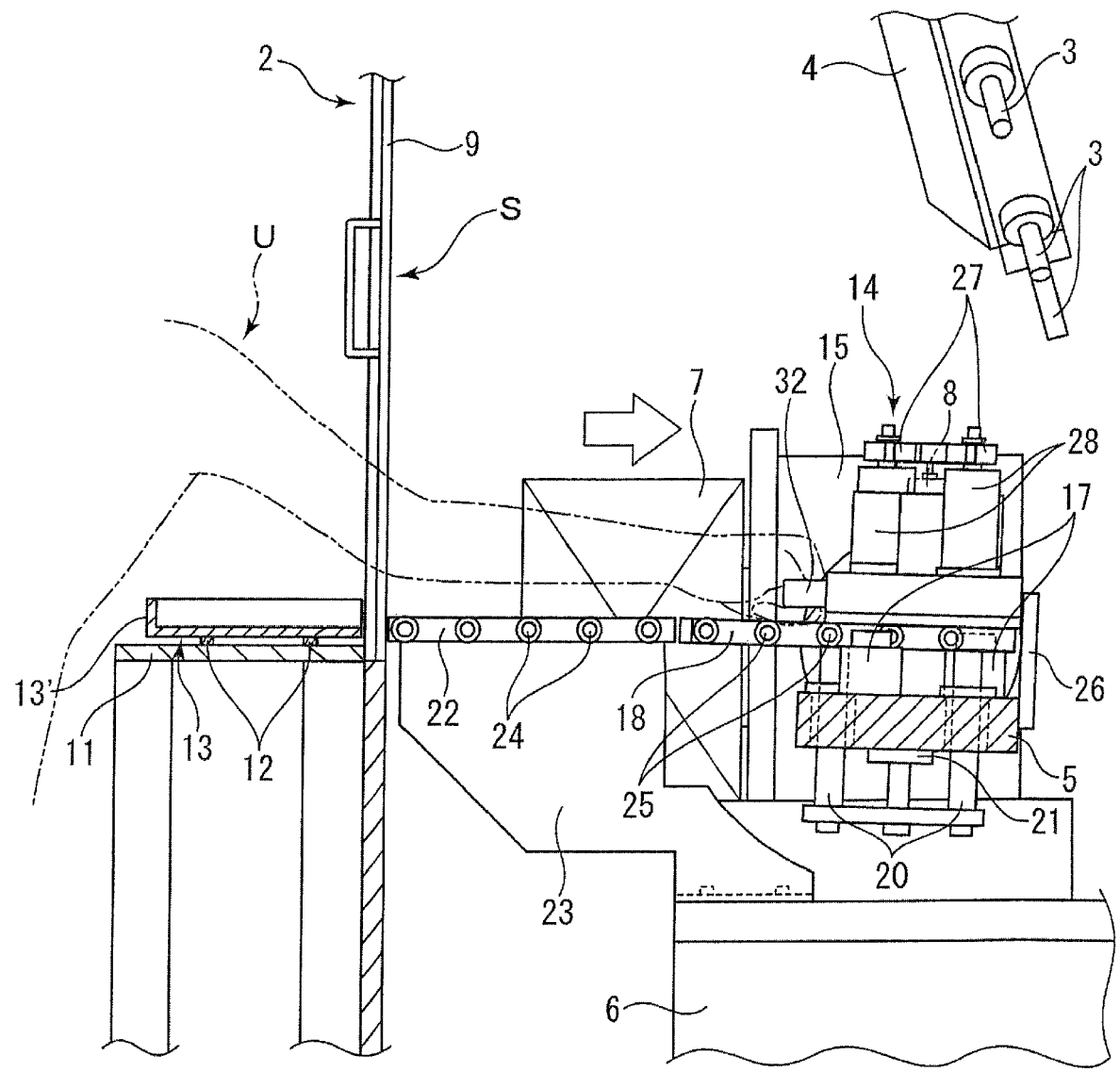
FIG. 9 is a side view showing the work of machining a workpiece using an NC machine tool.

A plurality of rollers 24, 25 is disposed on the fixed rail members 22 and the elevator rail members 18, as shown in FIG. 9, whereby the sliding friction generated between the fixed rail members 22, the elevator rail members 18, and the work palettes 14 can be reduced during movement of the work palettes 14, and the work palettes 14 are smoothly slid and moved on the elevator rail members 18 and the fixed rail members 22.

When the work palettes 14 are mounted on the elevator rail members 18, the elevator rail members 18 are inclined so as to slope downward to the rearward side, whereby the work palettes 14 mounted on the elevator rail members 18 move in the rearward direction (loading direction) by self-weight. The work palettes 14 stop moving when the rear end portion makes contact with the contact pieces 26, and the work palettes 14 are positioned without backtracking because of the slope of the elevator rail members 18. In other words, positioning can be reliably carried out because the work palettes 14 are held in a state of pressed contact against the contact pieces 26 even if the user releases the handles 32 of the work palettes 14 in the stopped position in which the rear end portions of the work palettes 14 are in contact with the contact pieces 26.

The work palettes 14 slide while the engagement grooves 33 provided to the bottom surface are in engagement with the fixed rail members 22 and the elevator rail members 18, whereby the work palettes 14 are guided and moved without shaking in the left/right direction (see FIG. 5), and the rear end portions of the work palettes 14 make contact with the contact pieces 26. The clamp rings 34 provided to the bottom surface of the work palettes 14 are thereby positioned above the clamp devices 17 provided to the upper surface of the clamp palette 5. The elevator rail members 18 for guiding the work palettes 14 are provided as far as the area above the clamp palette 5, whereby the work palettes 14 can be reliably guided to the machining position.

Figure 10:
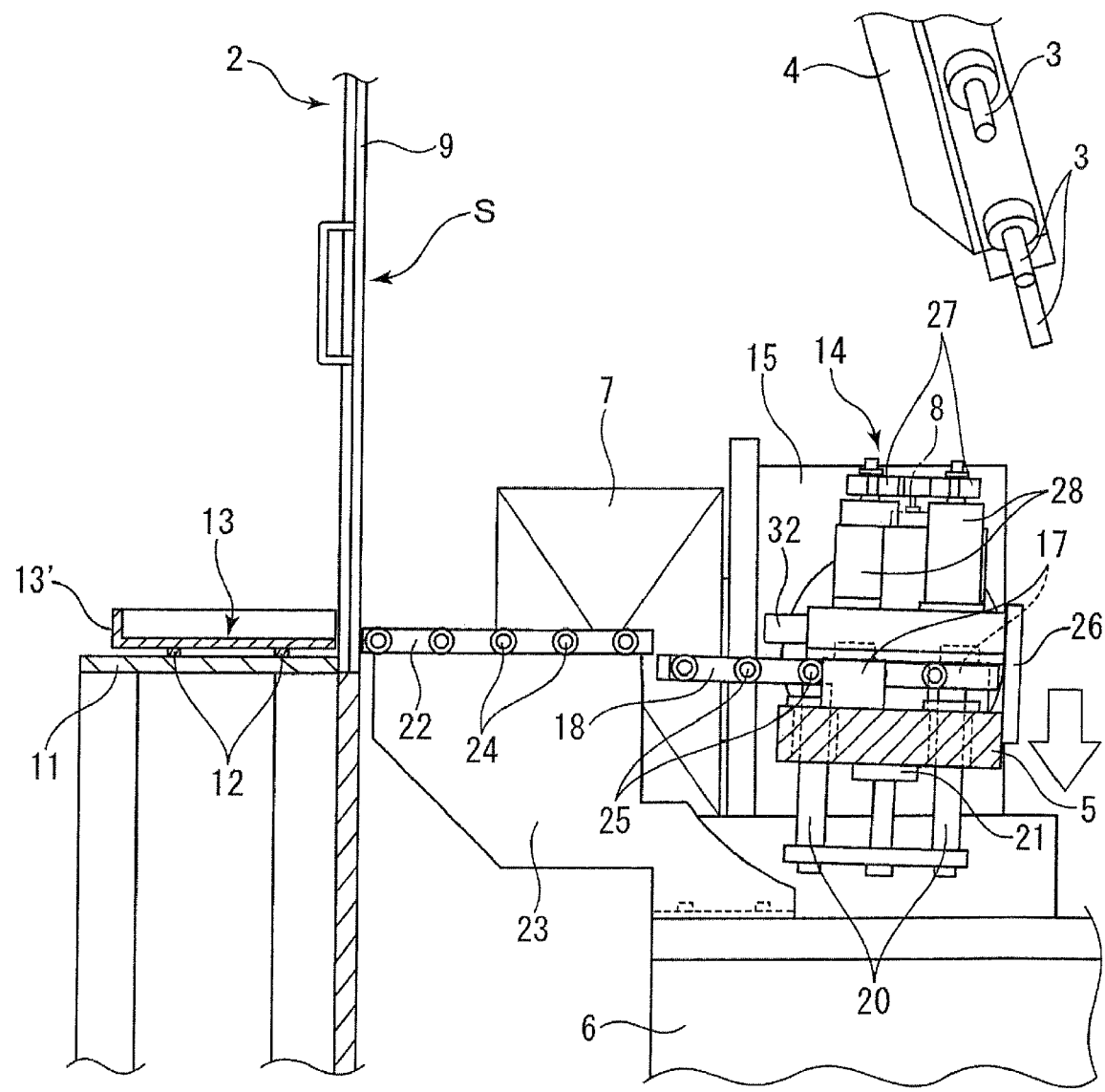
FIG. 10 is a side view showing the work of machining a workpiece using an NC machine tool.
Figure 11:
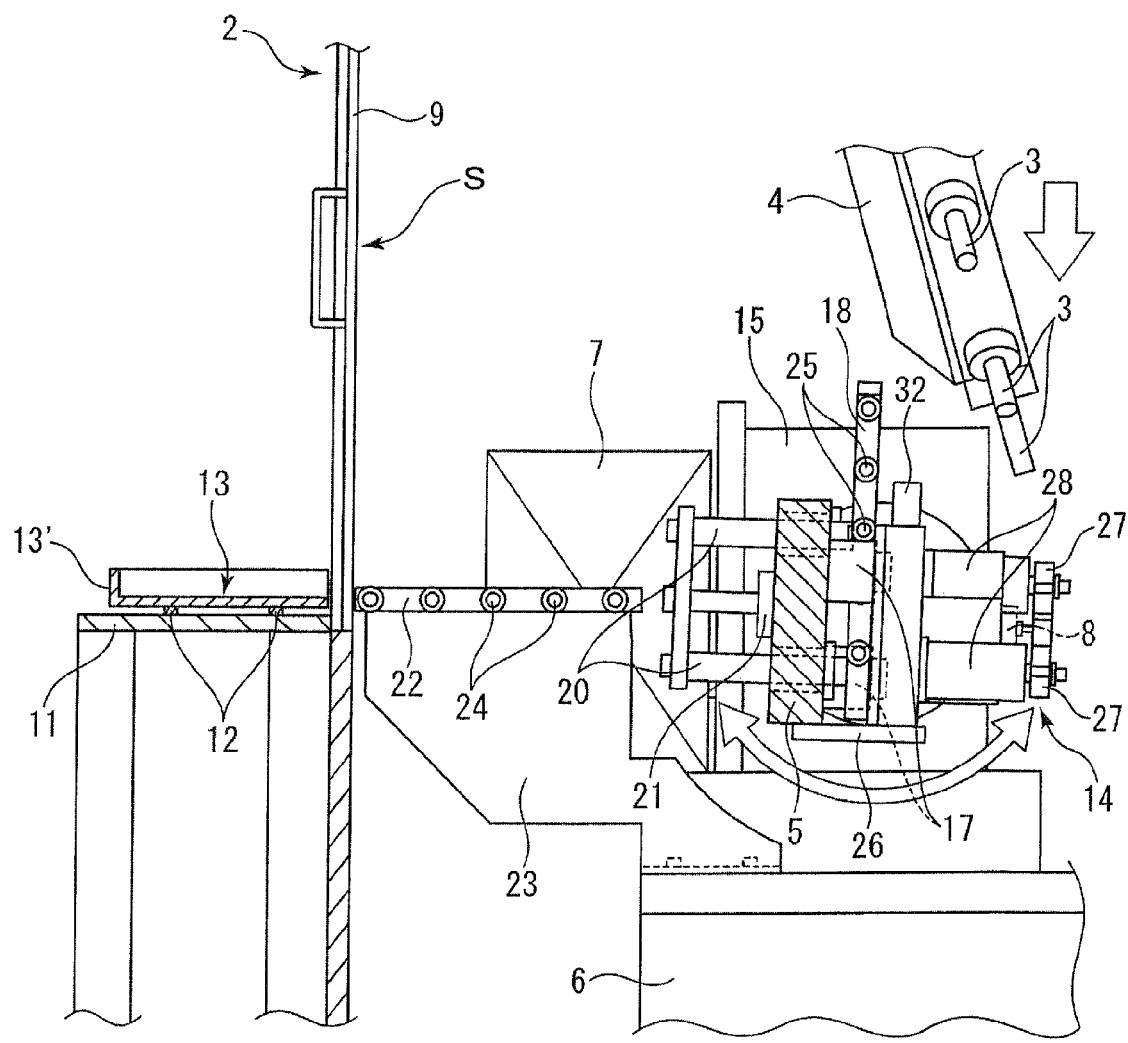
FIG. 11 is a side view showing the work of machining a workpiece using an NC machine tool.

The machining work is started when the user U operates the control panel 10 after the work palettes 14 have been positioned above the clamp palette 5. The controller (not shown) drives the actuator 21 and lowers the elevator rail members 18 on the basis of the operation of the control panel 10, as shown in FIG. 10, and the clamp devices 17 and the clamp rings 34 described above are connected.

The position of the work palette 14 when the rear end portion of the work palette 14 shown in FIG. 9 makes contact with the contact piece 26 is the upper position of the first jig of the present invention. The elevator rail members 18 shown in FIG. 10 are lowered, and the position in which the clamp ring 34 and the clamp device 17 are connected is the fitting position of the convexity and concavity of the present invention.

The controller (not shown) actuates the drive motor 7 and the tool unit 4 to start the machining work on the basis of the sensor (not shown) having sensed that the outflow of air from the gap 42 and the discharge port 41 of each of the clamp devices 17 described above has been stopped, as shown in FIG. 11. The clamp palette 5 is rotated in the vertical direction by the driving of the drive motor 7, and the upper surface as well as the front and back surfaces of the workpiece 8 are grinded by one of the drill tools 3 mounted in the tool unit 4.

On the other hand, when the workpiece 8 held by one of the work palettes 14 is machined, the palette guide 13 is moved in the left/right direction so that the location in which the work palette 14 is placed is the standby position β, as shown in FIG. 2.

The user connects the air hose 31 to the socket 30 of the palette guide 13 to push the chucks 27 upward, and mounts an unprocessed workpiece 8 on the other work palette 14, which is on standby in the standby position β. When the air hose 31 is removed from the socket 30, the chucks 27 are lowered, and the workpiece 8 is held on the work palette 14. The user uses the time in which the workpiece 8 held on the work palette 14 is being machined to dismount or mount (exchange) a workpiece 8 on the other work palette 14.

When the machining work of the workplace 8 held on one of the work palette 14 is completed, the controller (not shown) releases the connection between the clamp devices 17 and the clamp rings 34, and the elevator rail members 18 are elevated. The work palette 14 is separated from the clamp palette 5 while the workplace 8 is retained in a held state. The user U grips the handles 32 of the work palette 14 disposed on the clamp palette 5, i.e., in the machining position, as shown in FIG. 9, and pulls forward and retracts the work palette 14 to the retracted position a on the palette guide 13 (see FIG. 8).

The user U moves the palette guide 13 in the left/right direction so that the other work palette 14 holding an unprocessed workpiece 8 is moved from the standby position β at the front surface of the fixed rail members 22, i.e., to the retracted position α. The user U grips the handles 32 of the other work palette 14, pushes the work palette 14 while slidably moving on the elevator rail members 18 and the fixed rail members 22, moves the work palette 14 above the clamp palette 5, and starts machining work in the same manner as with the first work palette 14 described above. The first work palette 14, on which the machined workpiece 8 is held, is disposed in the standby position β at this time.

The user U connects the air hole 31 to the socket 30 of the first work palette 14, pushes the chucks 27 upward, and removes the workpiece 8. The user uses the time in which the workpiece 8 held on the other work palette 14 is being machined to dismount and mount the workpiece 8 by removing the machined workpiece 8 from the work palette 14 and mounting an unprocessed workpiece 8 on the work palette 14. Workpieces 8 are thereafter sequentially machined while the actions described above are repeated.

In the NC machine tool 1 of the present embodiment, the work palette 14 is moved and guided in the horizontal direction by the elevator rail members 18 and the fixed rail members 22. Therefore, the user can easily move the work palette 14 between the aperture S of the case 2 and the machining position by merely gripping the handle 32 and applying force in the horizontal direction, and the workpiece 8 is retracted from the machining position together with the work palette 14 after the machining of the workpiece 8 has ended, and a new work palette 14 that is separate from the work palette 14 on which the workpiece 8 is mounted in advance can be mounted instead on the clamp palette 5 disposed in the machining position. That is, rather than being mounted in the machining position as in the prior art, a plurality of workpieces 8 can be mounted and dismounted in a retracted position a and in a standby position β provided separately from the machining position, and the work time for machining the workpiece 8 is thereby not divided by the work of mounting and dismounted the workpiece 8. Therefore, the time in which the work of machining workpieces 8 is stopped can be minimized, and the utilization ratio of the NC machine tool 1 can thereby be effectively improved.

In other words, when the workpiece 8 is exchanged in the machining position, time is required to perform the work of mounting and dismounting workpieces 8 to and from the work palettes 14 in the case that there is a plurality of workpieces 8 as in the present embodiment. In contrast, the time needed to perform the mounting and dismounting work can be considerably reduced in the present invention because the work palettes 14, which constitute the second jig, are merely mounted and dismounted from the clamp palette 5, which constitute the first jig. In the particular case that there is a plurality of types of workpieces 8 to be machined, and the types of workpieces 8 to be machined are varied, the work palettes 14 as such are naturally exchanged in conjunction with the types of workpieces, and the mounting/dismounting mode of the workpiece 8 can also be varied. Therefore, the mounting/dismounting work carried out by the user U is in danger of decreasing. In contrast, sharing the work palettes 14 by a plurality of types of workpieces 8 prevents the efficiency of the mounting/dismounting work from being reduced even if the type of workpiece 8 to be machined is varied. This is because the work of mounting/dismounting the work palettes 14 to and from the clamp palette 5 does not change in accordance with the type of workpiece 8.

The engagement groove 33 for engaging the elevator rail members 18 and the fixed rail members 22 is formed on the work palette 14 to thereby allow the work palette 14 to move without shaking along the elevator rail members 18 and the fixed rail members 22. Therefore, positioning between the clamp palette 5 and the work palette 14 is facilitated when the work palette 14 is mounted on the clamp palette 5.

A plurality of rollers 24, 25 that make contact with the work palette 14 is provided to the elevator rail members 18 and fixed rail members 22, whereby frictional resistance is reduced when the work palette 14 moves along the elevator rail members 18 and the fixed rail members 22. Therefore, the user can more easily move the work palettes 14.

The clamp devices 17 are provided to the clamp palette 5; the clamp rings 34 that fit onto the clamp devices 17 are provided to the work palettes 14; and the work palettes 14 can be accurately positioned on the clamp palette 5 by mutually fitting the clamp devices 17 and the clamp rings 34.

The mounting function performed by the engagement portion 34' and the balls 44 is carried out after the fitting of the clamp devices 17 and the clamp rings 34 has been completed. The member for mounting/dismounting the clamp palette 5 and the work palettes 14, as well as the member for positioning during mounting/dismounting, can thereby be used in combination. Therefore, not only can manufacturing costs be reduced, but mounting on the work palettes 14 can also be reliably carried out because the work palettes 14 are mounted on the clamp palette 5 after positioning has been completed.

Elevator rail members 18 that elevate the work palette 14 are disposed between a position above of the clamp palette 5 and the fitting position of the clamp device 17 and the clamp ring 34, whereby the work palette 14 is reliably guided by the elevator rail members to a position above the clamp palette 5, and mounting is carried out by fitting the clamp device 17 and the clamp ring 34 in a state in which the work palette 14 remains mounted on the elevator rail members 18. Therefore, the work palette 14 can be easily exchanged.

In other words, in the present embodiment, the clamp palette 5 and the work palettes 14 are accurately positioned by the action of fitting the clamp devices 17 (convexities) and the clamp rings 34 (concavities). Therefore, the work palettes 14 must be lowered toward the clamp palette 5 after the work palettes 14 are moved horizontally from the retracted position α to a position above the clamp palette 5. In other words, the work palettes 14 must be horizontally and elevatably moved between the retracted position α and the fitting position on the clamp palette 5, but the movement between these points can be carried out in a state in which the palettes are being guided by the elevator rail members 18 and the fixed rail members 22, which are all the rail members. Therefore, the user can manually move the work palettes 14 in a very simple manner.

The elevator rail members 18 slope downward in the loading direction of the work palette 14, and a contact piece 26 for stopping the work palettes 14, which are moved and guided by the elevator rail members 18, at a position above the clamp palette 5 is also provided. Accordingly, the contact piece 26 and the self-weight of the work palettes 14 operate together to position and stop the work palettes 14 in a position above the clamp palette 5, and the work palettes 14 do not backtrack due to the slope of the elevator rail members 18.

The mount 11 has a single retracted position a for retracting the work palettes 14 from the machining position, and also has at least two standby positions β for mounting and dismounting workpieces 8 to and from the work palettes 14 in relation to the retracted position a. Accordingly, a work palette 14 can be moved to a single standby position β, another work palette 14 waiting in another standby position β can be moved to the machining position via the retracted position α, and the work palettes 14 can be rapidly exchanged on the mount 11.

The sliding surface 35' for sliding the work palettes 14 on the upper surface of the palette guide 13 is formed on the bottom surface of the work palettes 14, and the upper surface of the palette guide 13 is positioned at substantially the same height as the fixed rail members 22. Accordingly, the user can smoothly move the work palettes 14 between the palette guide 13 and the fixed rail members 22 by applying force to the work palettes 14 in the horizontal direction.

In accordance with the NC machine tool 1 of the present embodiment, the clamp palette 5 and the work palettes 14 are accurately positioned and connected by the clamp devices 17 (convexities) and the clamp rings 34 (concavities). Therefore, locating coordinates (centering) each time the work palettes 14 are exchanged is no longer required as long as the coordinates of the workpiece 8 or the work palettes 14 are located when the first workpiece 8 is machined, and the time in which the machining work of a plurality of workpieces 8 is stopped can be reduced.

A single chuck 27 as a holding means for holding a plurality (three, in the present invention) of workpieces 8 is provided to the work palette 14, and the work palette 14 is mounted on the clamp palette 5. Accordingly, a plurality of workpieces 8 can be disposed at one time on the clamp palette 5, i.e., in the machining position during the mounting/dismounting work. For this reason, a plurality of workpieces 8 can be disposed in the machining position in a shorter time than mounting and dismounting a plurality of workpieces 8 on the work palette 14 in the machining position, and the time during which the NC machine tool 1 is stopped can be shortened.

Embodiment 2

Figure 12:
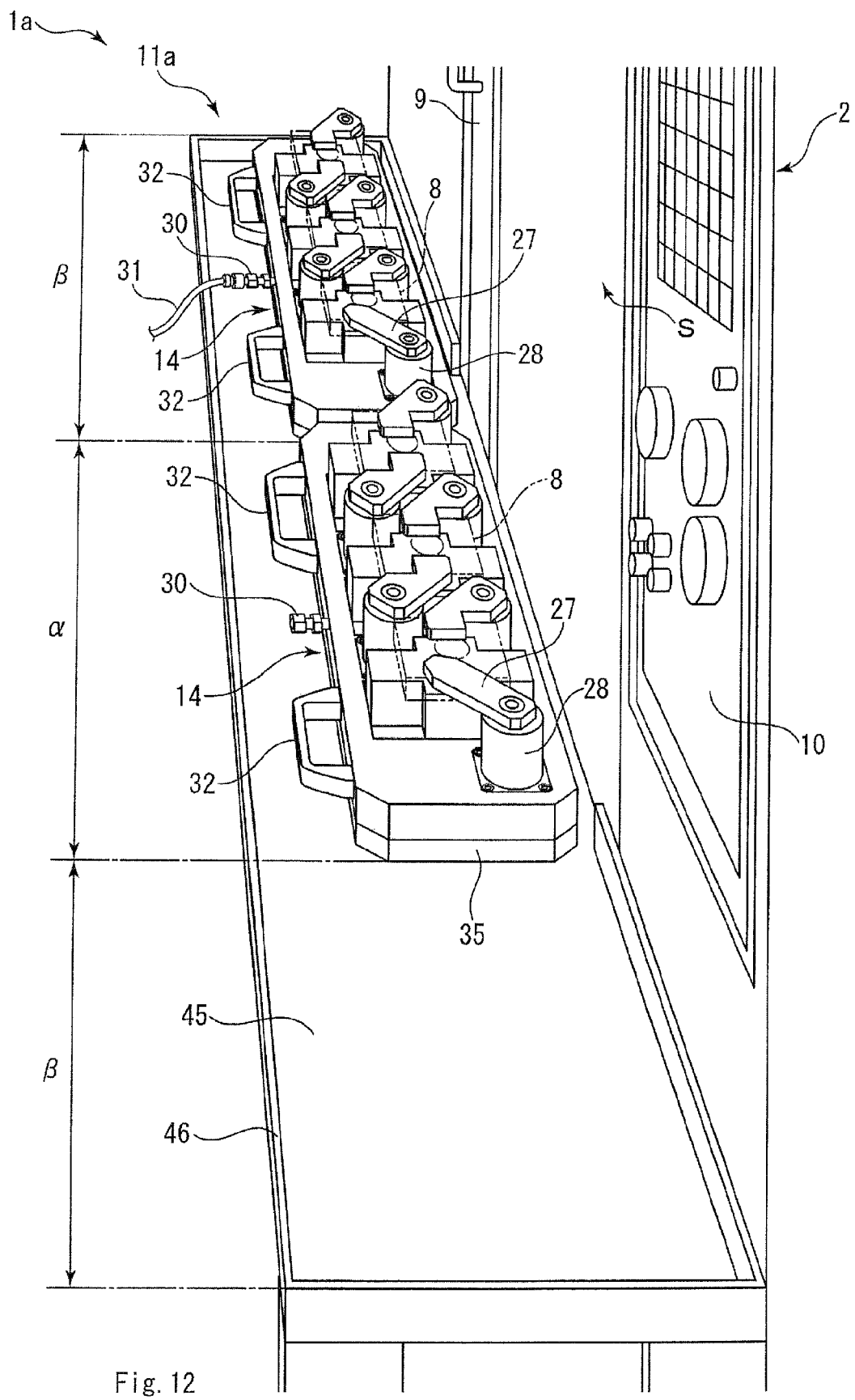
FIG. 12 is a perspective view showing the mount in embodiment 2.

Next, the mount 11a of the NC machine tool 1a according to embodiment 2 will be described with reference to FIG. 12. The same reference numerals are used for the same constituent elements as those described in the embodiment described above, and a redundant description is omitted. FIG. 12 is a perspective view showing the mount 11a in embodiment 2. Hereinbelow, the left side of the paper surface of FIG. 12 will be referred to as the front surface (front side) of the NC machine tool 1a.

The mount 11a in embodiment 2 has a flat plate member 45 in which the long side is oriented in the left/right horizontal direction, as shown in FIG. 12, and an erect piece 46 is erectly provided in a location other than the location that corresponds to the aperture S at four edges of the plate member 45. The height of the upper surface of the plate member 45 and the height of the fixed rail members 22 as the guidance pathway of the present invention are substantially the same, and two work palettes 14 are mounted on the upper surface of the plate member 45.

In embodiment 2, the area in front of the aperture S on the upper surface of the plate member 45 constitutes the retracted position a of the present invention, and the other areas on the upper surface of the plate member 45, i.e., the areas on the left and right sides of the retracted position a on the upper surface of the plate member 45, constitute the standby positions β of the present invention.

A guide piece 35 is provided to the lower surface of the work palettes 14 in the same manner as in embodiment 1 described above (see FIG. 6), and the sliding surface 35' of the guide piece 35 is made to slide on the upper surface of the plate member 45. Accordingly, the work palettes 14 can be slidably moved on the upper surface of the plate member 45. Since the guide piece 35 is brought into contact with the erect piece 46, the work palettes 14 are not liable to fall from the upper surface of the plate member 45.

The user temporarily mounts a work palette 14, which has been removed from the aperture S and on which a processed workpiece 8 is mounted, in the retracted position α. The work palette 14 is moved from the retracted position α to one of the standby positions β to the left or right, the work palette 14 which is positioned in the other retracted position α and on which an unprocessed workpiece 8 is mounted is moved to the retracted position α, and this work palette 14 is loaded from the aperture S into the case 2. The work of mounting and dismounting the workpiece 8 on the work palettes 14 is carried out in one of the standby positions β.

As described above, with the mount 11a of the NC machine tool 1a of the present embodiment 2, a sliding surface 35' for allowing the work palettes 14 to slide on the upper surface of the plate member 45 is formed on the bottom surface of the work palettes 14, and the height of the upper surface of the plate member 45 is positioned at substantially the same height as the fixed rail members 22, whereby the user can grip the handle 32 of the work palettes 14 and smoothly move [the work palettes] between the plate member 45 and the fixed rail members 22 without lifting the work palettes 14 from the upper surface of the plate member 45, by merely applying a force in the horizontal direction.

Embodiment 3

Figure 13:
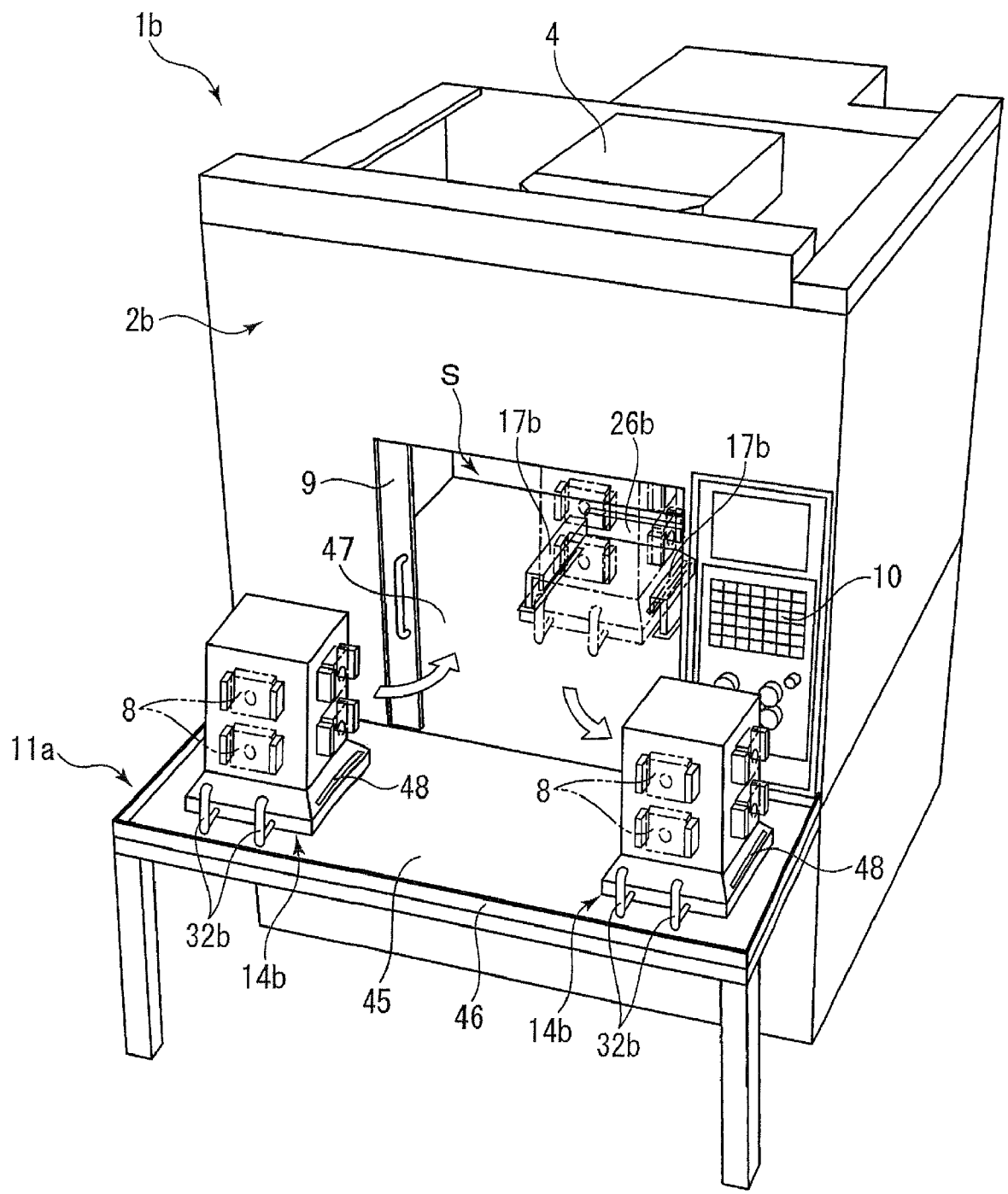
FIG. 13 is a perspective view showing the NC machine tool in embodiment 3.
Figure 14:
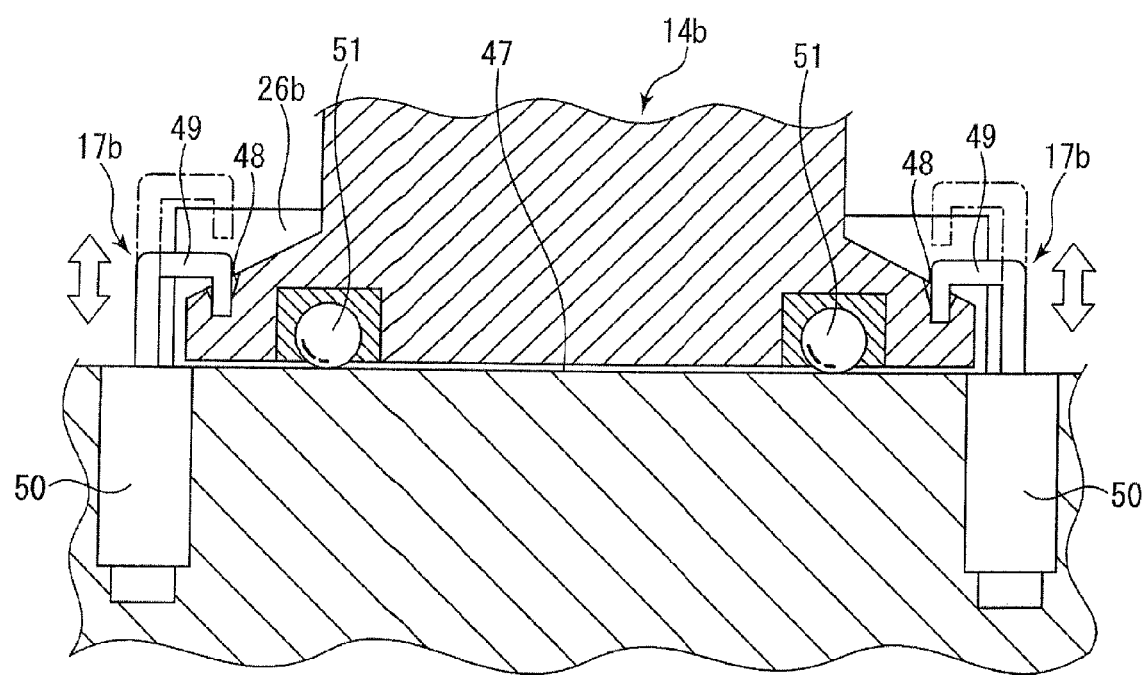
FIG. 14 is a perspective view showing the NC machine tool in embodiment 3.

Next, the NC machine tool 1b according to embodiment 3 will be described with reference to FIGS. 13 and 14. The same reference numerals are used for the same constituent elements as those described in the embodiments described above, and a redundant description is omitted. FIG. 13 is a perspective view showing the NC machine tool 1b in embodiment 3. FIG. 14 is a longitudinal sectional view showing the NC machine tool 1b in embodiment 3. Hereinbelow, the front side of the paper surface of FIG. 13 will be referred to as the front surface (front side) of the NC machine tool 1b.

The NC machine tool 1b in embodiment 3 has a mount 11a provided to the surface in front of the case 2b in the same manner as in embodiment 2 described above, as shown in FIG. 13. The interior of the case 2b has a machining surface plate 47 that forms a flat surface at the same height as the upper surface of the plate member 45 of the mount 11a. In the present embodiment 3, the area in front of the aperture S on the upper surface of the plate member 45 constitutes a retracted position, and the areas to the left and right of the retracted position constitute standby positions.

In the present embodiment 3, the machining surface plate 47 constitutes the first jig and guidance pathway of the present invention. Two clamp devices 17b as the convexities and the mounting/dismounting means of the present invention are disposed on the machining surface plate 47, and the contact piece 26b as the stopping means of the present invention is erectly provided. The area surrounded by the contact piece 26b and the clamp devices 17b on the machining surface plate 47 constitutes the machining position of the present invention.

Work palettes 14b as the second jig of the present invention that have a cubic shape are mounted on the plate member 45 of the mount 11a. Fitting grooves 48 as the concavities and mounting/dismounting means of the present invention are provided to the left and right edges of the work palettes 14b so as to open upward. Handles 32b, which constitute the handle parts of the present invention for the user to grip, are provided to the front side edges of the work palettes 14b.

Balls 51 as the sliding parts of the present invention are disposed on the lower surface of the work palettes 14b, as shown in FIG. 14, allowing the user to slidably move the work palettes 14b on the plate member 45 and the machining surface plate 47. The clamp devices 17b have clamp parts 49 in which the plate-shaped member is bent so as to form substantially the shape of the letter "C" as viewed from the front surface, and the clamp parts 49 are moved in the vertical direction by actuators 50 disposed on the machining surface plate 47.

When machining is to be performed, the user grips the handles 32b of a work palette 14b on the mount 11a, slidably moves the work palette 14b on the plate member 45 and the machining surface plate 47, and positions the work palette 14b in the area surrounded by the contact piece 26b and the clamp devices 17b on the machining surface plate 47, i.e., in the machining position. A controller (not shown) drives the actuators 50 and lowers the clamp parts 49, whereby the clamp parts 49 fit into the fitting grooves 48. At this point, the work palette 14b is secured in the machining position, and the work of machining the workpiece 8 by the tool unit 4 is started.

As described above, in the present embodiment 3, a first jig and a guidance pathway are dually used as the machining surface plate 47, and the machining surface plate 47 and the plate member 45 where the retracted position is disposed are at the same height. Therefore, the user can easily move the work palettes 14b between the machining position and the retracted positions by merely applying a force to the work palettes 14b in the horizontal direction. The guidance pathway of the present invention may be composed of a member for guiding at least the work palettes 14b in the horizontal direction, and any member may be used as long as the user can grip the handles 32b of the work palettes 14b and move [the work palettes] in the horizontal direction.

Balls 51, which serve as the sliding parts, are provided to the lower surface of the work palettes 14b, thereby allowing the user to easily move even heavy work palettes 14b, for example. The sliding parts of the present invention are not limited to the balls 51, and sliding resistance can be reduced when the work palettes 14b are moved by mounting rollers or wheels on the lower surface of the work palettes 14b.

Embodiments of the present invention were described above with reference to the diagrams, but the specific configuration is not limited to these embodiments, and variations and additions to the main points of the present invention that do not depart from the scope thereof are included in the present invention.

For example, in embodiment 1, a workpiece 8 was machined by mounting work palettes 14 in alternation with a single clamp palette 5 using two work palettes 14, but machining may be carried out using a plurality of three or more work palettes 14.

In the embodiments described above, a single work palette 14 was detachably mounted on a single clamp palette 5, but a plurality of work palettes 14 may be detachably mounted above and below or to the left and right on a single clamp palette 5.

In the embodiments described above, the same type of workpiece 8 was held on a plurality of work palettes 14 and the controller established settings for performing the same machining for each of the workpieces 8, but the present invention is not limited to this configuration, different types of workpieces 8 may be held on each of a plurality of work palettes 14, and the controller may establish settings for performing different types of machining for each of the workpieces 8. In such a configuration, different types of workpieces 8 can be machined using a single NC machine tool 1, and different types of workpieces 8 can be sequentially loaded in a simple manner into the NC machine tool 1 because the work palettes 14 can be mounted and dismounted from the clamp palette 5.

In embodiment 1 described above, clamp devices 17 as convexities were provided to the clamp palette 5, and clamp rings 34 as concavities fitted to the clamp devices 17 were provided to the work palettes 14. However, a configuration is also possible in which the clamp rings 34 as concavities are provided to the clamp palette 5, and the clamp devices 17 as convexities are provided to the work palettes 14. The work palettes 14 can be accurately positioned in relation to the clamp palette 5 irrespective of whether the convexities or concavities are provided to either one of the clamp palette 5 and the work palettes 14.

In embodiment 1 described above, an actuator 21 was driven as an elevator means, whereby the elevator rail members 18 were elevated or lowered to elevate or lower the work palettes 14, and the work palettes 14 were mounted and dismounted from the clamp palette 5. However, the mounting/dismounting of the work palettes 14 and the clamp palette 5 on the elevator rail members 18 can be carried out by elevating and lowering the clamp palette 5 without elevating or lowering the elevator rail members 18. The clamp devices 17 of the clamp palette 5 are elevated or lowered without separately elevating and lowering the work palettes 14 and the clamp palette 5, whereby the work palettes 14 can be mounted on and dismounted from the clamp rings 34, and the work palettes 14 and the clamp palette 5 can be mutually mounted and dismounted.

In the embodiments described above, a workpiece 8 was mounted on and dismounted from the work palettes 14 in a state in which the machined workpiece 8 is retracted onto the mount 11, i.e., to the standby position β. However, it is not necessarily required that the workpiece 8 be mounted on and dismounted from the work palette 14 in the standby position β each time the machining of the workpiece 8 has ended. For example, the workpiece 8 may be mounted on and dismounted from the work palette 14 in the standby position β only when the type of work palette 14 is changed in accordance with the change in the type of workpiece 8 to be machined. When the type of workpiece 8 is not changed, a configuration is also possible in which the user puts his hand through the aperture S of the case 2 each time the machining of the workpiece 8 has ended, and the workpiece 8 is directly mounted on and dismounted from the work palette 14 disposed on the clamp palette 5 in the machining position, i.e., the workpiece 8 is mounted and dismounted in the machining position.

In the embodiments described above, a numerically controlled NC machine tool 1 was used an example of a machine tool in which a controller (not shown) automatically controls the relative position between the drill tools 3, the tool unit 4, and the workpiece 8 on the basis of the arrangement position of the tool unit 4 and the arrangement position of the workpiece 8 defined by a coordinate value. However, the present invention is not limited to an NC machine tool 1, and application can also be made to a manual machine tool in which control of the relative position between the drill tools 3, the tool unit 4, and the workpiece 8 is carried out manually. In the case that application is made to this type of manual machine tool, the time in which the work of machining the workpiece 8 is stopped can be reduced and the utilization ratio of the machine tool apparatus can be improved by performing the work of machining the workpiece 8 held on one of the work palettes 14 in the machining position at the same time that the work of mounting and dismounting an unprocessed workpiece 8 on another work palette 14 is carried out.

The invention claimed is:

1. A machine tool apparatus for machining a machining object using a tool by controlling the relative position between the tool and said machining object, which machining object is held in a jig, the machine tool apparatus comprising:
   said jig comprises at least a first jig disposed in a machining position of said machining object disposed inside a case of said machine tool apparatus, and a second jig which is moveably configured so as to be separate from said at least first jig and in which second jig said machining object is detachably held;
   the at least first jig and the second jig have a mounting and dismounting device for detachably mounting said second jig on the at least first jig, and said second jig is provided with a handle for gripping when the second jig is to be moved;
   said case is provided with an aperture for loading and unloading said second jig between the exterior of said case to said machining position, a guidance pathway for moving and guiding said second jig in substantially the horizontal direction is provided between at least said machining position and said aperture, and said second jig can be moved along said guidance pathway in a state in which said handle is held, wherein said guidance pathway includes an elevator rail member that slopes downward towards the machining position and that is supported on the at least first jig for elevating and lowering said second jig.

2. The machine tool apparatus according to claim 1, wherein:
   said second jig has an engagement groove that engages said guidance pathway.

3. The machine tool apparatus according to claim 1, wherein said guidance pathway is provided with a plurality of rollers that are brought into contact with said second jig.

4. The machine tool apparatus according to claim 1, wherein:
   a convexity that fits into said second jig is provided to said at least first jig; and
   a concavity that fits onto said convexity is provided to said second jig.

5. The machine tool apparatus according to claim 4, wherein a mounting function performed by said mounting and dismounting device is carried out after the fitting of said convexity and said concavity is completed.

6. The machine tool apparatus according to claim 4, wherein:
- said convexity is provided to the upper surface of said at least first jig;
- said concavity is provided to the lower surface of said second jig; and
- said guidance pathway is disposed in a position above said first jig and the elevator rail member is configured for elevating and lowering said second jig between an upper position and a fitting position of said convexity and said concavity.

7. The machine tool apparatus according to claim 6, wherein:
- said at least first jig is provided with a stopping device for stopping movement of said second jig.

8. The machine tool apparatus according to claim 1, wherein:
- a mount on which said second jig can be mounted is disposed in a position close to said aperture outside of said case; and
- said mount has a single retracted position to which said second jig is retracted from said machining position, and also has, for the retracted position, at least two standby positions in which the machining object is mounted on or dismounted from said second jig.

9. The machine tool apparatus according to claim 8, wherein:
- a sliding part for allowing the second jig to slide on the upper surface of said mount is formed on the bottom surface of said second jig; and
- the upper surface of said mount is positioned at substantially the same height as said guidance pathway.

10. A machine tool apparatus for machining a machining object using a tool by controlling the relative position between the tool and said machining object, which machining object is held in a jig, the machine tool apparatus comprising:
- said jig comprises at least a first jig disposed in a machining position of said machining object disposed inside a case of said machine tool apparatus, and a second jig which is moveably configured so as to be separate from said at least first jig and in which second jig said machining object is detachably held;
- the at least first jig and the second jig have a mounting and dismounting device for detachably mounting said second jig on the at least first jig, and said second jig is provided with a handle for gripping when the second jig is to be moved;
- said case is provided with an aperture for loading and unloading said second jig between the exterior of said case to said machining position, a guidance pathway for moving and guiding said second jig in substantially the horizontal direction is provided between at least said machining position and said aperture, and said second jig can be moved along said guidance pathway in a state in which said handle is held, wherein said guidance pathway includes an elevator rail member with rollers thereon, which elevator rail member is supported on the at least first jig for elevating and lowering said second jig.

* * * * *